(12) United States Patent
Muralimanohar et al.

(10) Patent No.: US 12,659,313 B2
(45) Date of Patent: Jun. 16, 2026

(54) SYSTEMS AND METHODS FOR PROVIDING INSTANT PROVISIONING AND ACTIVATION OF A CLIENT DEVICE FOR A NETWORK

(71) Applicant: Verizon Patent and Licensing Inc., Basking Ridge, NJ (US)

(72) Inventors: Madhan Muralimanohar, Tampa, FL (US); Nidhi Bhardwaj, Alpharetta, GA (US); Ramanujam Achan Sethuraman, Plano, TX (US); Vanesa Kovac, Ridgewood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

(21) Appl. No.: 18/172,841

(22) Filed: Feb. 22, 2023

(65) Prior Publication Data
US 2024/0283793 A1 Aug. 22, 2024

(51) Int. Cl.
H04L 9/40 (2022.01)

(52) U.S. Cl.
CPC ............ H04L 63/10 (2013.01); H04L 63/205 (2013.01)

(58) Field of Classification Search
CPC .... H04M 3/436; H04M 3/4234; H04M 15/00; H04M 3/2263; H04M 15/84; H04M 17/00; H04L 41/5051; H04L 63/10; H04L 41/5054; H04L 41/5064; H04L 65/1046; H04L 65/1096; H04L 12/1403; H04N 21/4788; H04B 1/3816; H04W 8/265;

H04W 12/08; H04W 12/50; H04W 76/15; H04W 4/50; H04W 8/183; H04W 8/205; G06F 9/445; G06F 9/541
See application file for complete search history.

(56) References Cited

U.S. PATENT DOCUMENTS

| | | | | |
|---|---|---|---|---|
| 6,269,399 B1 * | 7/2001 | Dyson | ................. | H04L 12/1403 709/224 |
| 6,351,770 B1 * | 2/2002 | Li | ........................ | H04L 41/5054 709/225 |
| 6,574,323 B1 * | 6/2003 | Manuel | ................. | H04M 3/436 379/207.02 |
| 6,901,440 B1 * | 5/2005 | Bimm | ................. | H04L 41/5051 709/225 |
| 7,266,371 B1 * | 9/2007 | Amin | ...................... | H04W 8/18 455/418 |
| 8,976,685 B1 * | 3/2015 | Venizelos | ............... | H04W 8/18 370/252 |
| 9,756,505 B1 * | 9/2017 | Jiang | .................... | H04W 12/069 |
| 11,039,305 B1 * | 6/2021 | Sikes | .................... | H04W 8/183 |

(Continued)

*Primary Examiner* — Dustin Nguyen

(57) ABSTRACT

A device may receive a request for provisioning and activating a client device for a network, and may extract one or more key attributes from the request. The device may determine, based on the one or more key attributes, whether the client device qualifies for instant activation. The device may selectively provision the network for the client device, and activate the client device with an instant activation framework based on determining that the client device qualifies for instant activation; or may provision the network for the client device, and activate the client device with a regular activation framework based on determining that the client device fails to qualify for instant activation.

20 Claims, 8 Drawing Sheets

100

(56) References Cited

U.S. PATENT DOCUMENTS

| | | | | |
|---|---|---|---|---|
| 2003/0013434 | A1* | 1/2003 | Rosenberg | H04M 17/00 455/406 |
| 2003/0083081 | A1* | 5/2003 | Sanders, III | H04M 3/2263 455/466 |
| 2004/0242209 | A1* | 12/2004 | Kruis | H04W 4/50 455/461 |
| 2005/0060748 | A1* | 3/2005 | Berman | H04N 21/4788 705/26.1 |
| 2005/0153682 | A1* | 7/2005 | Minear | H04L 63/10 455/408 |
| 2006/0030315 | A1* | 2/2006 | Smith | H04W 8/205 455/432.3 |
| 2006/0143098 | A1* | 6/2006 | Lazaridis | H04M 15/84 705/34 |
| 2006/0160546 | A1* | 7/2006 | Tang | H04L 41/5064 455/461 |
| 2007/0143613 | A1* | 6/2007 | Sitch | H04W 76/50 713/168 |
| 2009/0061839 | A1* | 3/2009 | Zimmerman | H04W 8/265 455/419 |
| 2009/0157457 | A1* | 6/2009 | Huuhtanen | H04L 41/5054 705/26.1 |
| 2010/0030905 | A1* | 2/2010 | Fikouras | H04L 65/1096 709/228 |
| 2010/0099390 | A1* | 4/2010 | Vendrow | H04M 3/4234 455/414.1 |
| 2011/0069702 | A1* | 3/2011 | Oktay | H04L 65/1046 370/352 |
| 2013/0018948 | A1* | 1/2013 | Douillet | G06F 9/541 709/204 |
| 2013/0217361 | A1* | 8/2013 | Mohammed | H04W 4/50 455/411 |
| 2015/0148020 | A1* | 5/2015 | Laden | H04W 12/08 455/418 |
| 2015/0181419 | A1* | 6/2015 | Mistry | G06F 9/445 455/419 |
| 2016/0323735 | A1* | 11/2016 | Lumbatis | H04W 12/50 |
| 2017/0094524 | A1* | 3/2017 | Mazzarella | H04L 63/10 |
| 2017/0142757 | A1* | 5/2017 | McKibben | H04W 4/90 |
| 2018/0160253 | A1* | 6/2018 | Ahluwalia | H04B 1/3816 |
| 2020/0213193 | A1* | 7/2020 | Newell | H04W 8/18 |
| 2021/0385283 | A1* | 12/2021 | Talebi Fard | H04W 12/06 |
| 2022/0038887 | A1* | 2/2022 | Chaugule | H04M 15/00 |
| 2022/0167146 | A1* | 5/2022 | Khanduri | H04W 4/50 |
| 2023/0284301 | A1* | 9/2023 | Cui | H04W 76/15 370/329 |

* cited by examiner

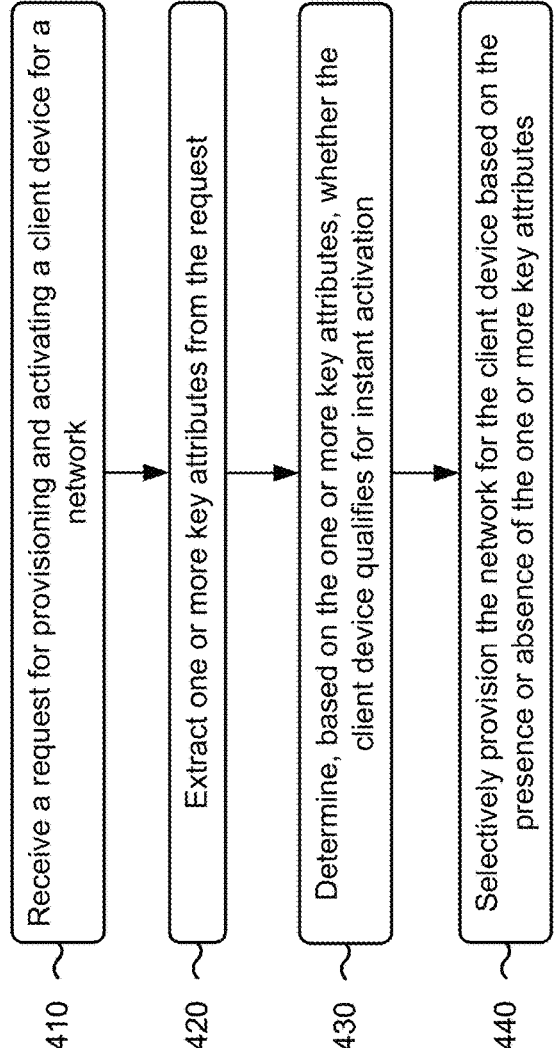

410 — Receive a request for provisioning and activating a client device for a network 420 — Extract one or more key attributes from the request 430 — Determine, based on the one or more key attributes, whether the client device qualifies for instant activation 440 — Selectively provision the network for the client device based on the presence or absence of the one or more key attributes

SYSTEMS AND METHODS FOR PROVIDING INSTANT PROVISIONING AND ACTIVATION OF A CLIENT DEVICE FOR A NETWORK

BACKGROUND

A network, such as a fifth generation (5G) wireless core network, needs to be provisioned with subscriber (e.g., client device) details in various network elements in order for the client device to activate a service with the network.

BRIEF DESCRIPTION OF THE DRAWINGS

FIG. 4 is a flowchart of an example process for providing instant provisioning and activation of a client device for a network.

DETAILED DESCRIPTION OF EXAMPLE EMBODIMENTS

Figure 1A:
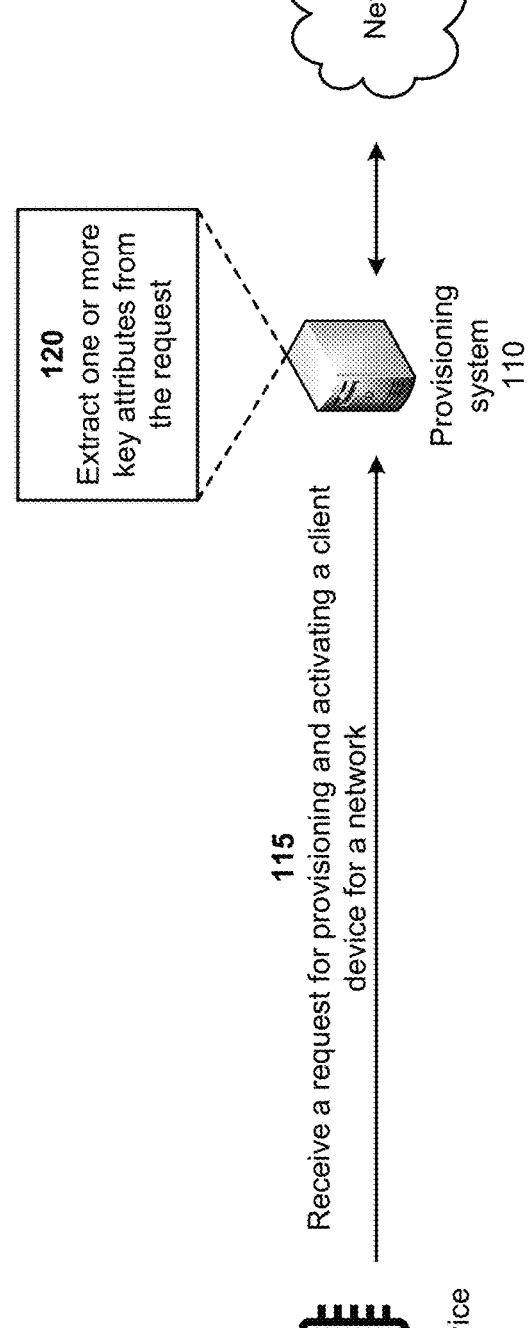
FIGS. 1A-1E are diagrams of an example associated with providing instant provisioning and activation of a client device for a network.

The following detailed description of example implementations refers to the accompanying drawings. The same reference numbers in different drawings may identify the same or similar elements.

Current provisioning systems for provisioning and activating a client device for a network follows a regular or traditional provisioning process where each provisioning request needs to be processed through various stages within the provisioning systems. For example, provisioning and activation requests are sent via a common queue to a provisioning system, and each request needs to be processed through a provisioning process so that client devices (e.g., subscribers) can be provisioned/activated in the network. Thus, the traditional provisioning process may result in delayed provisioning and activation of network services for particular client devices. These particular client devices (e.g., low/ultra-low latency devices, critical 5G Internet of Things (IoT) devices, such as security monitoring devices, and/or the like) require instant activation with a network to support critical services without delay. Even if a provisioning system identifies a request as being associated with a critical client device, the provisioning process cannot be accelerated for the critical client device since all requests are processed through a common processing queue that does not differentiate on request type. Thus, current techniques for provisioning and activating client devices consume computing resources (e.g., processing resources, memory resources, communication resources, and/or the like), networking resources, and/or other resources associated with delaying activation of critical client devices, failing to provide network services to client devices in a timely manner, provisioning less critical client devices before provisioning more critical client devices, unnecessarily utilizing a complex and time consuming provisioning process, and/or the like.

Some implementations described herein provide a provisioning system that provides instant provisioning and activation of a client device for a network. For example, the provisioning system may receive a request for provisioning and activating a client device for a network, and may extract one or more key attributes from the request. The provisioning system may determine, based on the one or more key attributes, whether the client device qualifies for instant activation. The provisioning system may selectively provision the network for the client device, and activate the client device with an instant activation framework based on determining that the client device qualifies for instant activation; or may provision the network for the client device, and activate the client device with a regular activation framework based on determining that the client device fails to qualify for instant activation.

In this way, the provisioning system provides instant provisioning and activation of a client device for a network. For example, the provisioning system may provision critical network elements of the network to activate critical services for client devices in a timely manner. The provisioning system may utilize an instant activation framework to provision and activate the critical network elements in near-real-time, without queuing of activation requests received from the client devices. The instant activation framework may simplify the provisioning process and may process an activation request directly in the network. The provisioning system may utilize real-time synchronous application programming interfaces (APIs) to receive instant activation requests and to provision the activation requests directly in the network. Thus, the provisioning system may conserve computing resources, networking resources, and/or other resources that would have otherwise been consumed by delaying activation of critical client devices, failing to provide network services to client devices in a timely manner, provisioning less critical client devices before provisioning more critical client devices, unnecessarily utilizing a complex and time consuming provisioning process, and/or the like.

FIGS. 1A-1E are diagrams of an example 100 associated with providing instant provisioning and activation of a client device for a network. As shown in FIGS. 1A-1E, example 100 includes a client device 105, a provisioning system 110 (e.g., a mobile telephony activation system (MTAS)), and a network. In some implementations, the network may include a fifth generation (5G) core network with network elements, such as a charging function (CHF), a uniform data repository (UDR), a subscriber profile controller (SPC), a unified data management (UDM) device, a diameter routing agent (DRA), a subscription locator function (SLF), a telephony application server (TAS), a network slice selection function (NSSF), a network exposure function (NEF), an authentication server function (AUSF), a network repository function (NRF), a policy control function (PCF), an application function (AF), an access and mobility management function (AMF), a session management function (SMF), a user plane function (UPF), and/or the like. Further details of the client device 105, the provisioning system 110, and the network are provided elsewhere herein. Although implementations described herein depict a single client device 105 and a single network, in some implementations, the provisioning system 110 may be associated with multiple client devices 105 and/or multiple networks.

As shown in FIG. 1A, and by reference number 115, the provisioning system 110 may receive a request for provisioning and activating a client device 105 for a network. For example, the client device 105 may generate the request for provisioning and activating the client device 105 for utilizing the network (e.g., for utilizing a service provided by one or more network elements of the network). In some implementations, the request may include information identifying a device type of the client device 105 (e.g., a 5G device), a device make of the client device 105 (e.g., Make ABCD), a device model of the client device 105 (e.g., Model SECUR-EXXXT), a service type of the network requested by the client device 105 (e.g., 5G Mobility), and/or the like. The client device 105 may provide the request for provisioning and activating the client device 105 for utilizing the network to the provisioning system 110, and the provisioning system 110 may receive the request.

As further shown in FIG. 1A, and by reference number 120, the provisioning system 110 may extract one or more key attributes from the request. For example, the provisioning system 110 may parse the information provided in the request or provisioning and activating the client device 105 for utilizing the network, and may review the information provided in the request. The provisioning system 110 may extract or identify one or more key attributes from the information provided in the request. In some implementations, the one or more key attributes may include the device type of the client device 105 (e.g., a 5G cell phone, a 5G IoT device, and/or the like), the service type of the network requested by the client device 105 (e.g., 5G Mobility, a low latency service, a 5G IoT service, and/or the like), and other information indicating whether the client device 105 requires regular activation for the network or instant activation for the network.

Figure 1B:
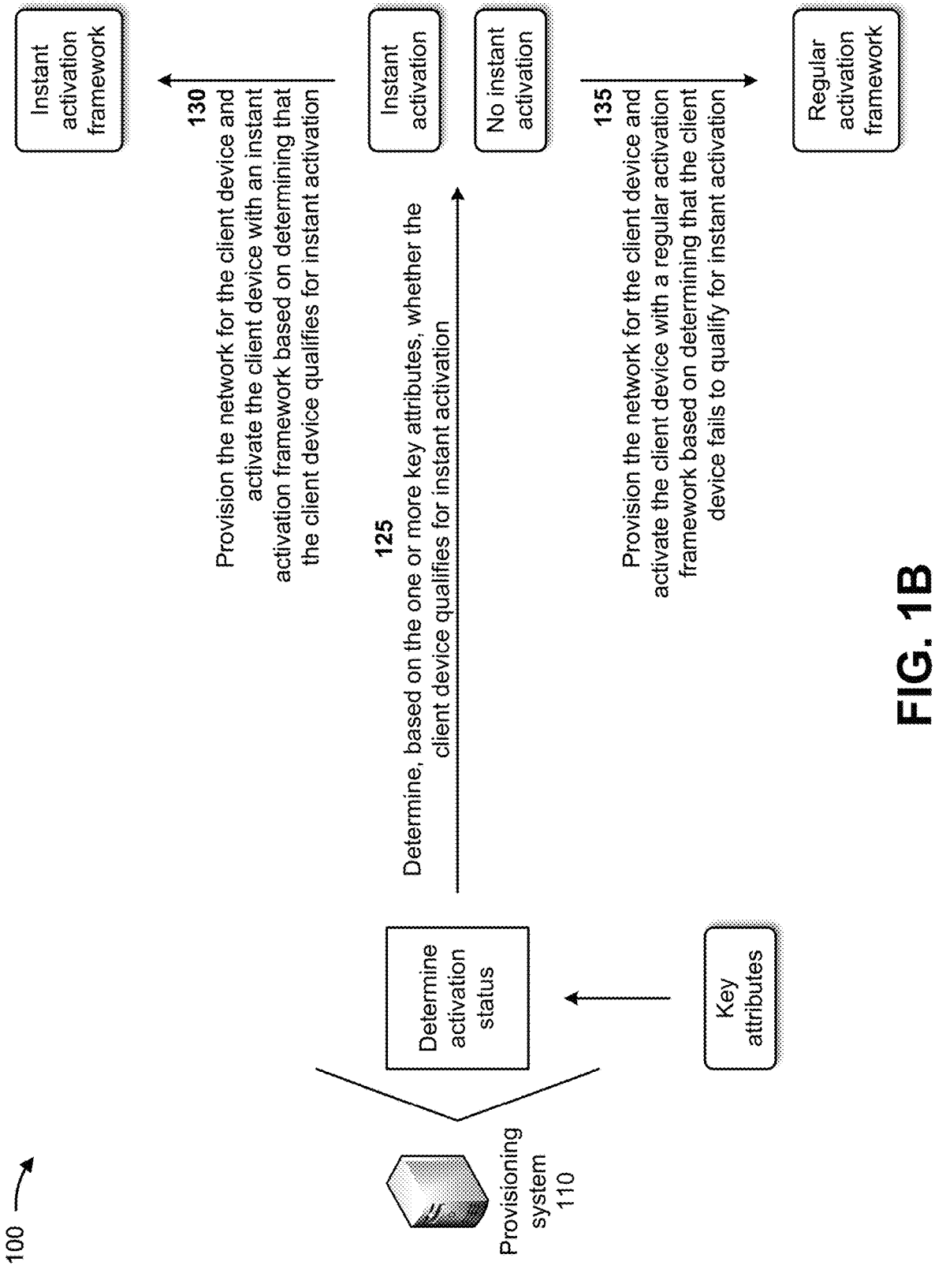

As shown in FIG. 1B, and by reference number 125, the provisioning system 110 may determine, based on the one or more key attributes, whether the client device 105 qualifies for instant activation. For example, the provisioning system 110 may analyze the one or more key attributes, and may determine whether the client device 105 qualifies for instant activation based on analyzing the one or more key attributes. In some implementations, the provisioning system 110 may determine, based on the one or more key attributes, that the client device 105 qualifies for instant activation. For example, when the one or more key attributes indicate that the client device 105 is a critical client device (e.g., a 5G IoT security monitoring device) or requests a critical network service (e.g., an extreme mobile broadband service, a low latency service, a massive IoT communication service, and/ or the like), the provisioning system 110 may determine that the client device 105 qualifies for instant activation.

Alternatively, the provisioning system 110 may determine, based on the one or more key attributes, that the client device 105 fails to qualify for instant activation. For example, when the one or more key attributes indicate that the client device 105 is a noncritical client device (e.g., a 5G Mobility device) or requests a noncritical network service (e.g., 5G Mobility, and/or the like), the provisioning system 110 may determine that the client device 105 fails to qualify for instant activation.

As further shown in FIG. 1B, and by reference number 130, the provisioning system 110 may provision the network for the client device 105 and may activate the client device 105 with an instant activation framework based on determining that the client device 105 qualifies for instant activation. For example, when the provisioning system 110 determines that the client device 105 qualifies for instant activation, the provisioning system 110 may utilize the instant activation framework to provision the network for the client device 105 and to activate the client device 105. Further details of the instant activation framework are provided below in connection with FIGS. 1C-1E. In some implementations, the instant activation framework may activate the client device 105 in near-real-time (e.g., in less than one minute) relative to receiving the request and without adding the request to a request queue.

In some implementations, when provisioning the network for the client device 105 and activating the client device 105 with the instant activation framework, the provisioning system 110 may utilize one or more real-time synchronous APIs to provision the network for the client device 105 and to activate the client device 105. For example, the provisioning system 110 may utilize real-time synchronous APIs to receive the request from the client device 105, to communicate with and provision network elements of the network for the client device 105, to activate the client device 105, and/or the like.

As further shown in FIG. 1B, and by reference number 135, the provisioning system 110 may provision the network for the client device 105 and may activate the client device 105 with a regular activation framework based on determining that the client device 105 fails to qualify for instant activation. For example, when the provisioning system 110 determines that the client device 105 fails to qualify for instant activation, the provisioning system 110 may utilize the regular activation framework to provision the network for the client device 105 and to activate the client device 105. In some implementations, the regular activation framework may fail to activate the client device 105 in near-real-time relative to receiving the request. In some implementations, when provisioning the network for the client device 105 and activating the client device 105 with the regular activation framework, the provisioning system 110 may identify one or more network elements, of the network, to be provisioned based on the request, and may generate one or more provisioning commands (e.g., that provision a network service for the client device 105) and one or more activation commands (e.g., that activate the client device 105 for the network service) for the one or more network elements based on the request. The provisioning system 110 may add the request to a request queue for a time period (e.g., in minutes, hours, and/or the like), and may provision the one or more network elements with the one or more provisioning commands after the time period expires. The provisioning system 110 may then activate the client device 105 based on the one or more activation commands.

Figure 1C:
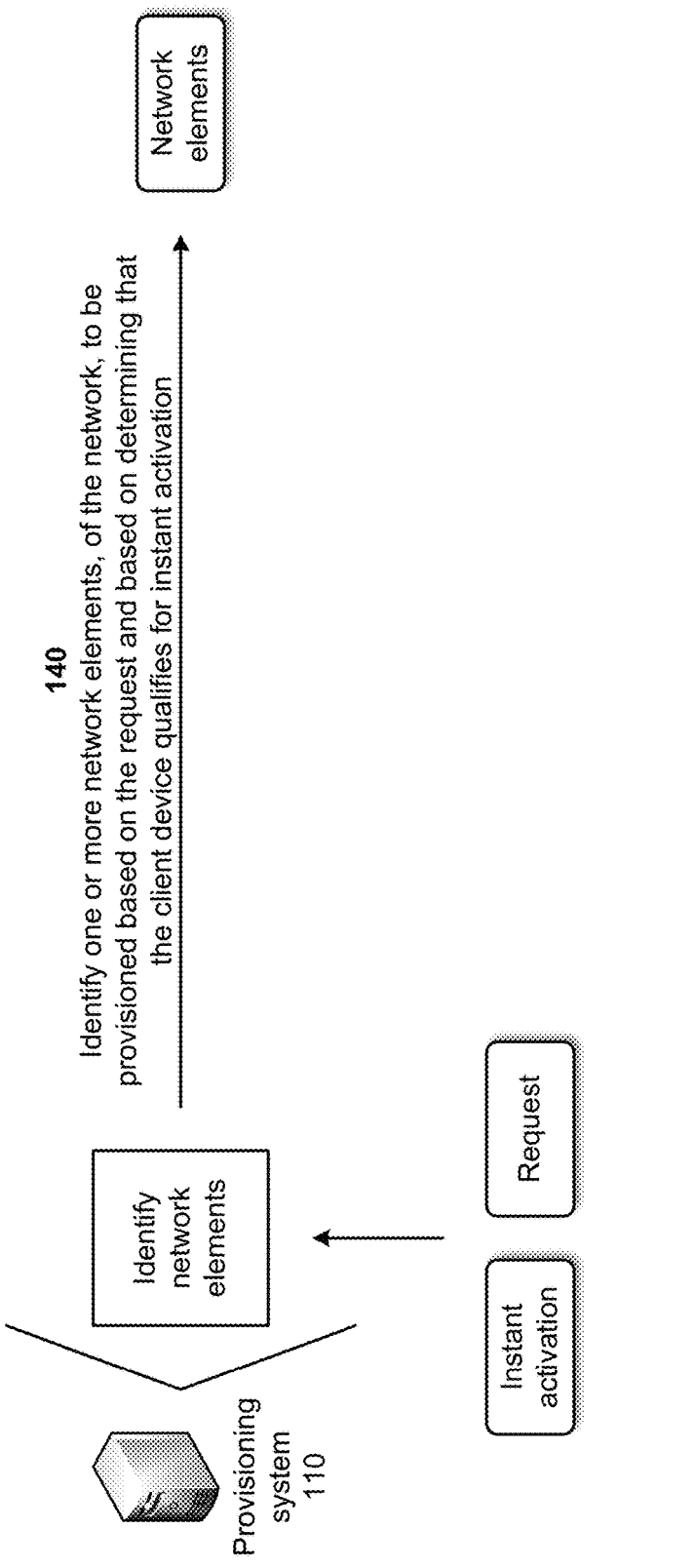

As shown in FIG. 1C, and by reference number 140, the provisioning system 110 may identify one or more network elements, of the network, to be provisioned based on the request and based on determining that the client device 105 qualifies for instant activation. For example, when the provisioning system 110 determines that the client device 105 qualifies for instant activation, the provisioning system 110 may identify one or more network elements, of the network, to be provisioned based on the request. In some implementations, the provisioning system 110 may analyze the request to determine the network service requested by the client device 105, and may identify the one or more network elements, of the network, to be provisioned for providing the network service to the client device 105.

Activating critical network services for the client device 105 may require provisioning, with the instant activation framework, critical network elements, such as a CHF, a UDR, an SPC, a UDM device, a DRA, an SLF, a TAS, and/or the like. The provisioning system 110 may utilize the regular activation framework for provisioning noncritical network elements (e.g., network elements other than the critical network elements) for providing the network service to the client device 105. In some implementation, when provisioning the network for the client device 105 and activating the client device 105 with the instant activation framework, the provisioning system 110 may identify one or more first network elements (e.g., critical network elements), of the network, to be provisioned based on the request, and may identify one or more second network elements (e.g., noncritical network elements), of the network, to be provisioned based on the request. The provisioning system 110 may provision the one or more first network elements for the client device 105 and may activate the client device 105 with the instant activation framework. The provisioning system 110 may provision the one or more second network elements for the client device 105 and activate the client device 105 with a regular activation framework.

Figure 1D:
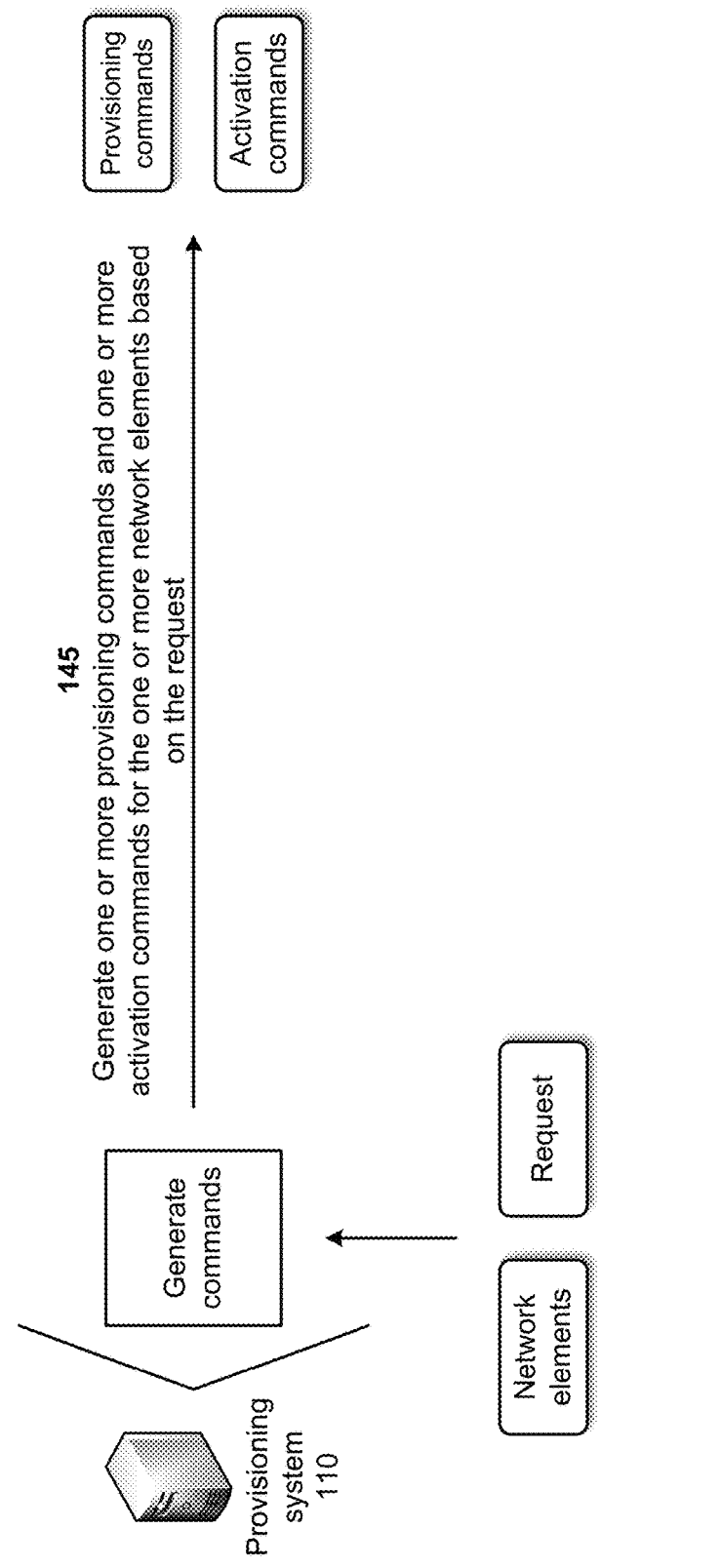

As shown in FIG. 1D, and by reference number 145, the provisioning system 110 may generate one or more provisioning commands and one or more activation commands for the one or more network elements based on the request. For example, after identifying the one or more network elements, of the network, to be provisioned, the provisioning system 110 may generate one or more provisioning commands and one or more activation commands for the one or more network elements based on the request. In some implementations, the one or more provisioning commands may include commands that, when executed by the one or more network elements, cause the one or more network elements to provision the client device 105 for the requested network service. In some implementations, the one or more activation commands may include commands that, when executed by the one or more network elements, cause the one or more network elements to activate the client device 105 for the requested network service.

Figure 1E:
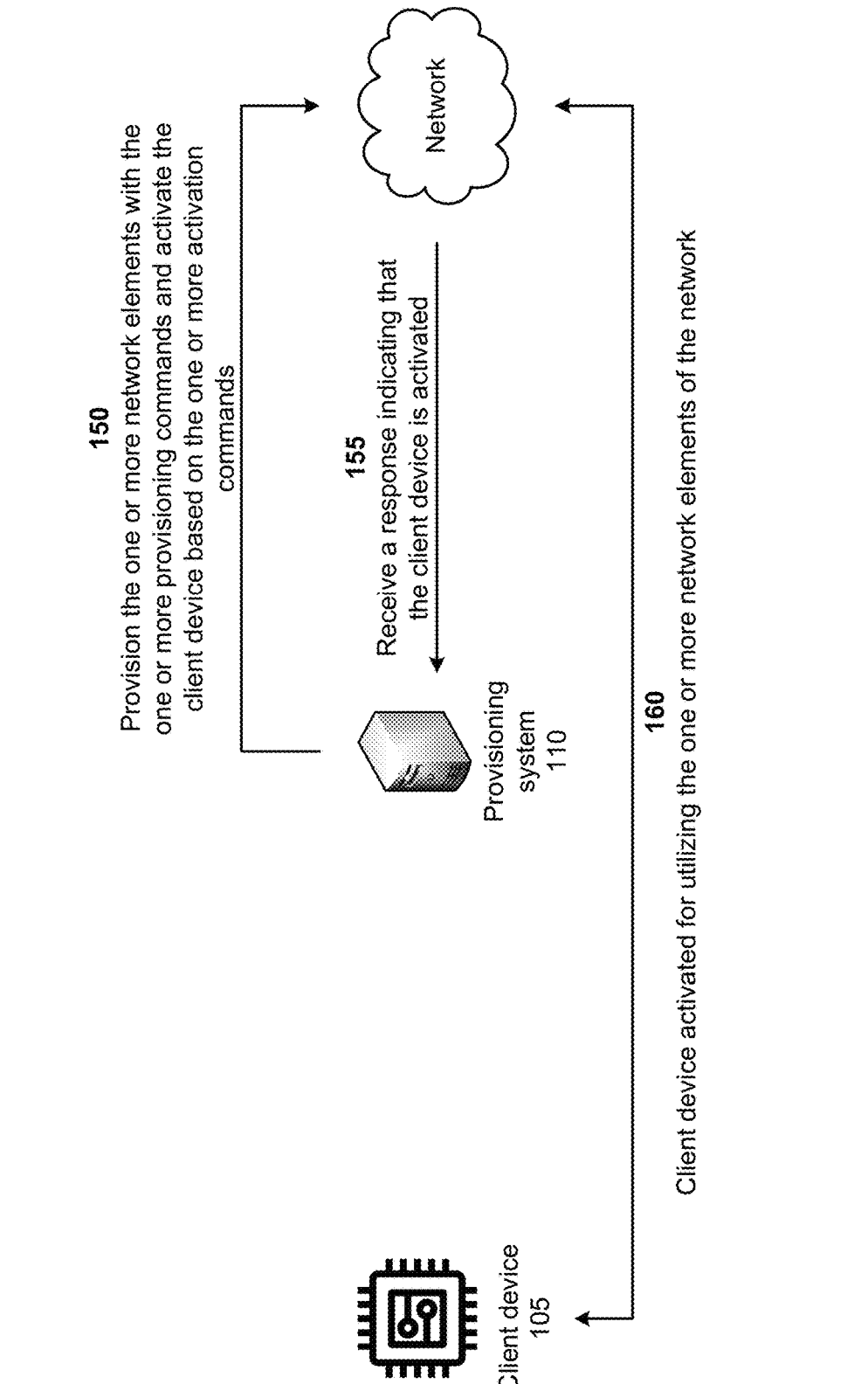

As shown in FIG. 1E, and by reference number 150, the provisioning system 110 may provision the one or more network elements with the one or more provisioning commands and may activate the client device 105 based on the one or more activation commands. For example, the provisioning system 110 may provide the one or more provisioning commands to the one or more network elements. The one or more network elements may execute the one or more provisioning commands to provision the client device 105 for the requested network service. The provisioning system 110 may provide the one or more activation commands to the one or more network elements. The one or more network elements may execute the one or more activation commands, after provisioning the client device 105 for the requested network service, to activate the client device 105 for the requested network service.

As further shown in FIG. 1E, and by reference number 155, the provisioning system 110 may receive a response indicating that the client device 105 is activated. For example, after provisioning and activating the client device 105 for the requested network service, the one or more network elements may generate the request indicating that the client device 105 is activated for the requested network service. The one or more network elements may provide the response to the provisioning system 110, and the provisioning system 110 may receive the response indicating that the client device 105 is activated for the requested network service.

As further shown in FIG. 1E, and by reference number 160, the client device 105 may be activated for utilizing the one or more network elements of the network. For example, after being provisioned and activated for the requested network service, the client device 105 may utilize the one or more network elements of the network to receive the requested network service from the network. In some implementations, the client device 105 may be activated for the requested network service in near-real-time (e.g., in less than one minute) relative to receiving the request and without providing the request to a request queue.

In this way, the provisioning system 110 provides instant provisioning (in real time or near-real time) and activation of a client device 105 for a network. For example, the provisioning system 110 may provision critical network elements of the network to activate critical services for client devices 105 in a timely manner. The provisioning system 110 may utilize an instant activation framework to provision and activate the critical network elements in near-real-time, without queuing of activation requests received from the client devices 105. The instant activation framework may simplify the provisioning process and may process an activation request directly in the network. The provisioning system 110 may utilize real-time synchronous APIs to receive instant activation requests and to provision the activation requests directly in the network. Thus, the provisioning system 110 may conserve computing resources, networking resources, and/or other resources that would have otherwise been consumed by delaying activation of critical client devices 105, failing to provide network services to client devices 105 in a timely manner, provisioning less critical client devices 105 before provisioning more critical client devices 105, unnecessarily utilizing a complex and time-consuming provisioning process, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
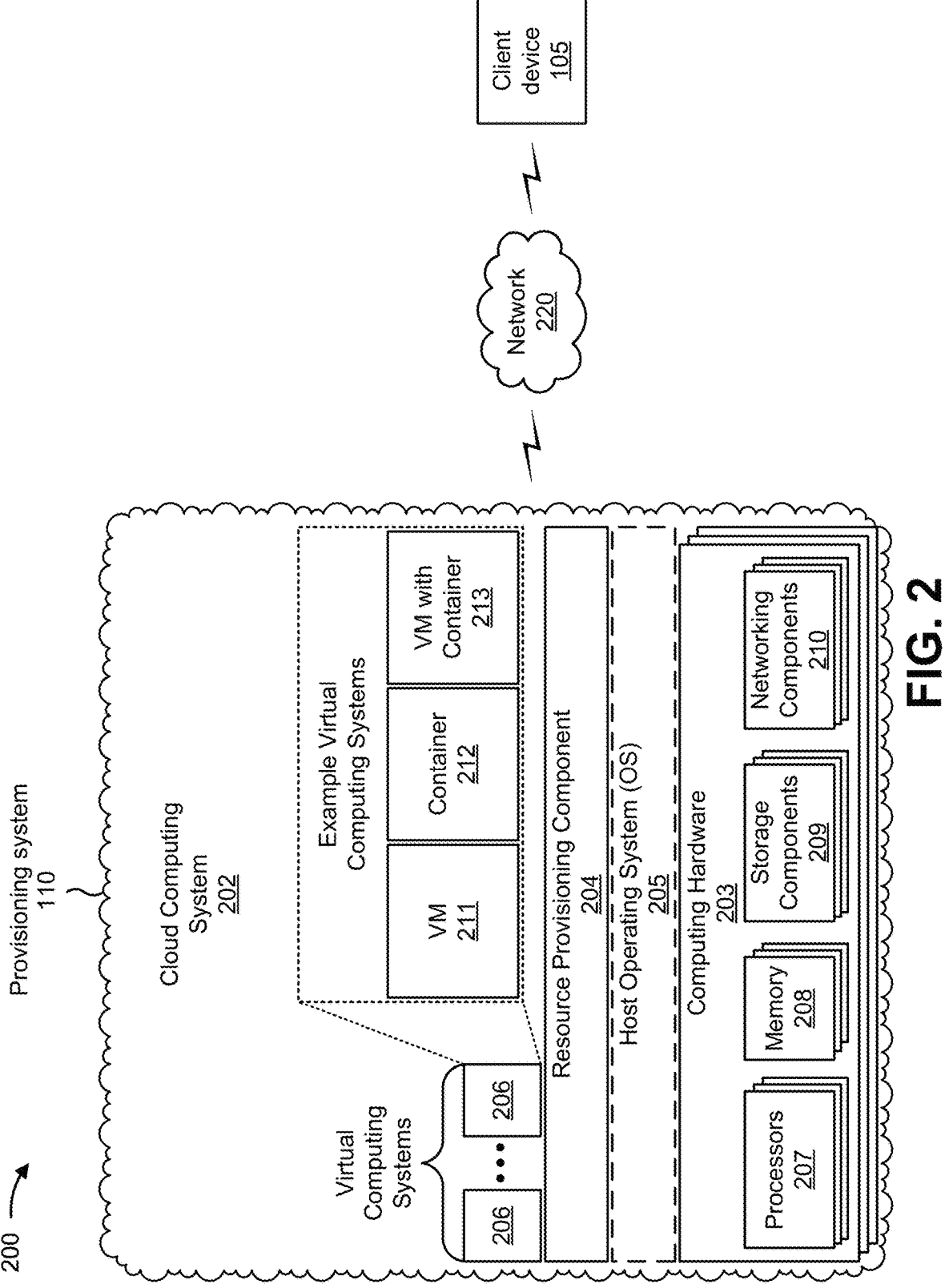
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the provisioning system 110, which may include one or more elements of and/or may execute within a cloud computing system 202. The cloud computing system 202 may include one or more elements 203-213, as described in more detail below. As further shown in FIG. 2, the environment 200 may include the client device 105 and/or a network 220. Devices and/or elements of the environment 200 may interconnect via wired connections and/or wireless connections.

The client device 105 may include one or more devices capable of receiving, generating, storing, processing, and/or providing information associated, as described elsewhere herein. The client device 105 may include a communication device and/or a computing device. For example, the client device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an Internet of Things (IoT) device or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the provisioning system 110 may include one or more elements 203-213 of the cloud computing system 202, may execute within the cloud computing system 202, and/or may be hosted within the cloud computing system 202, in some implementations, the provisioning system 110 may not be cloud-based (e.g., may be implemented outside of a cloud computing system) or may be partially cloud-based. For example, the provisioning system 110 may include one or more devices that are not part of the cloud computing system 202, such as a device 300 of FIG. 3, which may include a standalone server or another type of computing device. The provisioning system 110 may perform one or more operations and/or processes described in more detail elsewhere herein.

The network 220 may include one or more wired and/or wireless networks. For example, the network 220 may include a cellular network (e.g., a 5G network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
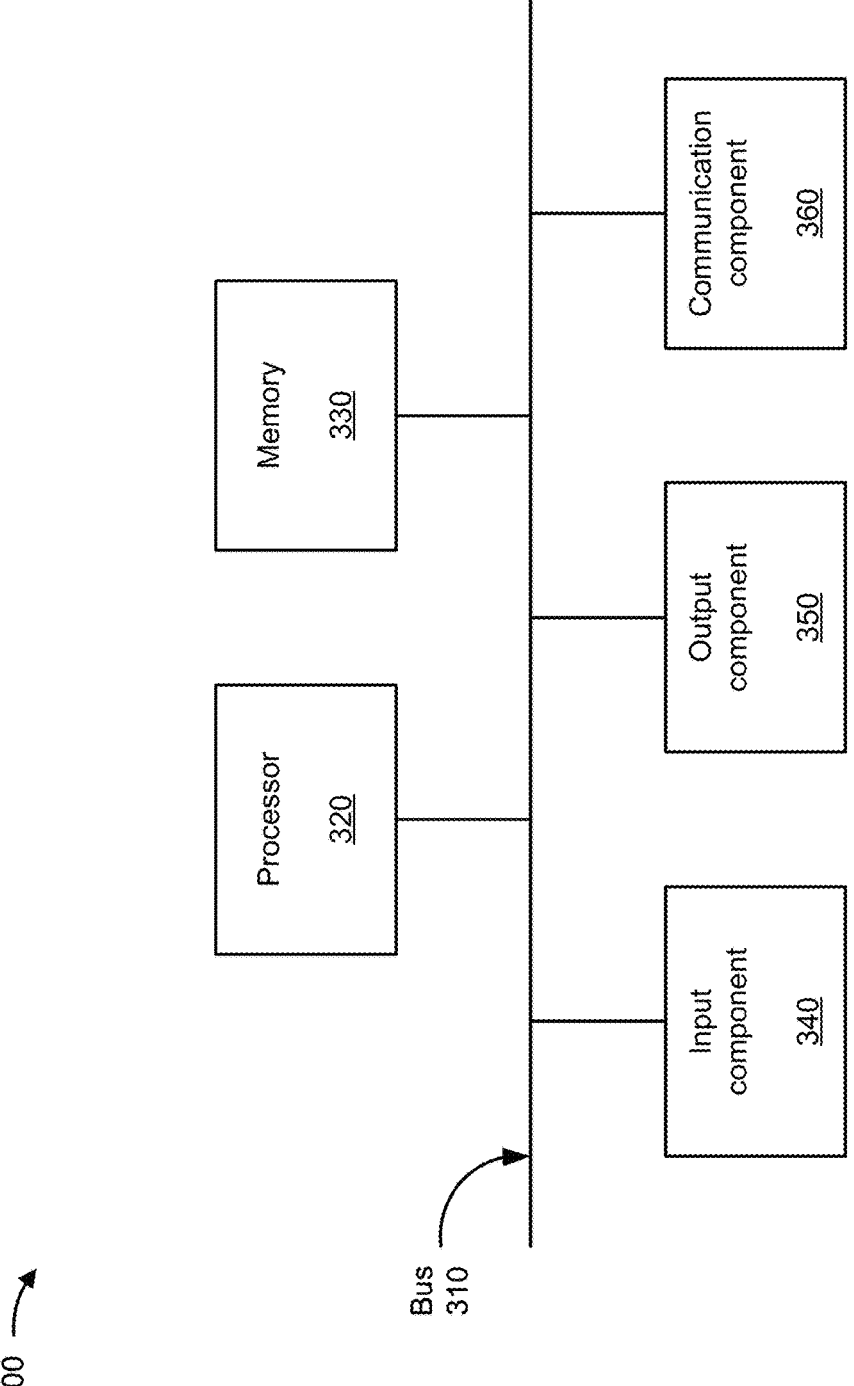
FIG. 3 is a diagram of example components of one or more devices of FIG. 2.

FIG. 3 is a diagram of example components of a device 300, which may correspond to the client device 105 and/or the provisioning system 110. In some implementations, the client device 105 and/or the provisioning system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for providing instant provisioning and activation of a client device for a network. In some implementations, one or more process blocks of FIG. 4 may be performed by a device (e.g., the provisioning system 110). In some implementations, one or more process blocks of FIG. 4 may be performed by another device or a group of devices separate from or including the device, such as a client device (e.g., the client device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request for provisioning and activating a client device for a network (block 410). For example, the device may receive a request for provisioning and activating a client device for a network, as described above. In some implementations, the device is one of a provisioning system or a mobile telephony activation system.

As further shown in FIG. 4, process 400 may include extracting one or more key attributes from the request (block 420). For example, the device may extract one or more key attributes from the request, as described above.

As further shown in FIG. 4, process 400 may include determining, based on the one or more key attributes, whether the client device qualifies for instant activation (block 430). For example, the device may determine, based on the one or more key attributes, whether the client device qualifies for instant activation, as described above.

As further shown in FIG. 4, process 400 may include selectively provisioning the network for the client device based on the presence or absence of the one or more key attributes (block 440). For example, the device may selectively provision the network for the client device, and activate the client device with an instant activation framework based on determining that the client device qualifies for instant activation; or provision the network for the client device, and activate the client device with a regular activation framework based on determining that the client device fails to qualify for instant activation, as described above. In some implementations, the instant activation framework provisions the network for the client device and activates the client device without providing the request to a queue.

In some implementations, provisioning the network for the client device and activating the client device with the instant activation framework includes identifying one or more network elements, of the network, to be provisioned based on the request; generating one or more provisioning commands and one or more activation commands for the one or more network elements based on the request; provisioning the one or more network elements with the one or more provisioning commands; and activating the client device based on the one or more activation commands and in near-real-time relative to receiving the request. In some implementations, provisioning the network for the client device and activating the client device with the instant activation framework further includes receiving a response indicating that the client device is activated. In some implementations, the client device is activated to utilize the one or more network elements of the network. In some implementations, the client device is one of a low latency device or an IoT security monitoring device.

In some implementations, provisioning the network for the client device and activating the client device with the regular activation framework includes identifying one or more network elements, of the network, to be provisioned based on the request; generating one or more provisioning commands and one or more activation commands for the one or more network elements based on the request; providing the request to a request queue for a time period; provisioning the one or more network elements with the one or more provisioning commands after the time period expires; and activating the client device based on the one or more activation commands.

In some implementations, provisioning the network for the client device and activating the client device with the instant activation framework includes identifying one or more first network elements, of the network, to be provisioned based on the request; identifying one or more second network elements, of the network, to be provisioned based on the request; provisioning the one or more first network elements for the client device and activate the client device with the instant activation framework; and provisioning the one or more second network elements for the client device and activate the client device with a regular activation framework. In some implementations, the one or more first network elements include one or more of a charging function, a uniform data repository, a subscriber profile controller, a unified data management device, a diameter routing agent, a subscription locator function, or a telephony application server. In some implementations, the one or more first network elements are critical network elements and the one or more second network elements are noncritical network elements.

In some implementations, provisioning the network for the client device and activating the client device with the instant activation framework includes utilizing one or more real-time synchronous application programming interfaces to provision the network for the client device and activating the client device. In some implementations, the instant activation framework causes the request to bypass a processing queue of the regular activation framework.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, a request for provisioning and activating a client device for a network;

extracting, by the device, one or more attributes from the request;

determining, by the device and based on the one or more attributes, a type of device corresponding to the client device or a type of service requested by the client device;

determining, by the device, whether the type of device or the type of service is associated with provisioning and activating the client device using a first process or a second process of a provisioning system for the network, the second process being different from the first process;

provisioning, by the device, the network for the client device, and activating the client device using the first process based on determining that the type of device or the type of service is associated with provisioning and activating the client device using the first process of the provisioning system; and provisioning, by the device, the network for the client device and activating the client device using the second process when the type of device or the type of service is not associated with provisioning and activating the client device using the first process;

wherein provisioning, by the device, the network for the client device and activating the client device using the first process comprises:

causing the request to bypass a processing queue of the provisioning system of a regular activation framework associated with the second process; and wherein provisioning, by the device, the network for the client device and activating the client device using the second process comprises:

providing the request to the processing queue for a time period.

2. The method of claim 1, wherein provisioning the network for the client device and activating the client device using the first process further comprises:

identifying one or more network elements, of the network, to be provisioned based on the request;

generating one or more provisioning commands and one or more activation commands for the one or more network elements based on the request;

provisioning the one or more network elements with the one or more provisioning commands; and activating the client device based on the one or more activation commands and in near-real-time relative to receiving the request.

3. The method of claim 2, wherein provisioning the network for the client device and activating the client device using the first process further comprises:

receiving a response indicating that the client device is activated.

4. The method of claim 2, wherein the client device is activated to utilize the one or more network elements of the network.

5. The method of claim 2, wherein the client device is one of a low latency device or an Internet of Things security monitoring device.

6. The method of claim 1, wherein provisioning the network for the client device and activating the client device using the second process when the type of device or the type of service is not associated with provisioning and activating the client device using the first process further comprises:

identifying one or more network elements, of the network, to be provisioned based on the request;

generating one or more provisioning commands and one or more activation commands for the one or more network elements based on the request;

provisioning the one or more network elements with the one or more provisioning commands after the time period expires; and activating the client device based on the one or more activation commands.

7. A device, comprising:

one or more processors configured to:

receive a request for provisioning and activating a client device for a network;

extract one or more attributes from the request;

determine, based on the one or more attributes, a type of device corresponding to the client device or a type of service requested by the client device;

determine whether the type of device or the type of service is associated with provisioning and activating the client device using a first process or a second process of a provisioning system for the network, the second process being different from the first process;

provision the network for the client device and activate the client device for the network using the first process based on determining that the type of device or the type of service is associated with provisioning and activating the client device for the network using the first process; and provision the network for the client device and activate the client device for the network using the second process based on determining that the type of device or the type of service is not associated with provisioning and activating the client device for the network using the first process;

wherein the one or more processors, to provision the network for the client device and activate the client device for the network using the first process, are configured to:

cause the request to bypass a processing queue of the provisioning system of a regular activation framework associated with the second process; and wherein the one or more processors, to provision the network for the client device and activate the client device for the network using the second process, are configured to:

provide the request to the processing queue for a time period.

8. The device of claim 7, wherein the one or more processors, to provision the network for the client device and activate the client device for the network using the first process, are further configured to:

identify one or more first network elements, of the network, to be provisioned based on the request; and provision the one or more first network elements for the client device and activate the client device using the first process; and wherein the one or more processors, to provision the network for the client device and activate the client device for the network using the second process, are further configured to:

identify one or more second network elements, of the network, to be provisioned based on the request; and provision the one or more second network elements for the client device and activate the client device using the second process.

9. The device of claim 8, wherein the one or more first network elements include one or more of:

a charging function, a uniform data repository, a subscriber profile controller, a unified data management device, a diameter routing agent, a subscription locator function, or a telephony application server.

10. The device of claim 8, wherein the one or more first network elements are critical network elements and the one or more second network elements are noncritical network elements.

11. The device of claim 7, wherein the device is one of the provisioning system or a mobile telephony activation system.

12. The device of claim 7, wherein the one or more processors, to provision the network for the client device and activate the client device for the network using the first process, are further configured to:

utilize one or more real-time synchronous application programming interfaces to receive the request and to provision one or more network elements of the network for the client device.

13. A non-transitory computer-readable medium storing a set of instructions, the set of instructions comprising:

one or more instructions that, when executed by one or more processors of a device, cause the device to:

receive a request for provisioning and activating a client device for a network;

extract one or more attributes from the request;

determine, based on the one or more attributes, a type of device corresponding to the client device or a type of a service requested by the client device;

determine whether the type of device or the type of service is associated with provisioning and activating the client device using a first process or a second process of a provisioning system for the network, the second process being different from the first process;

provision the network for the client device and activate the client device using the first process when the type of device or the type of service is associated with provisioning and activating the client device using the first process; and provision the network for the client device and activate the client device using the second process when the type of device or the type of service is not associated with provisioning and activating the client device using the first process;

wherein the one or more instructions, that cause the device to provision the network for the client device and activate the client device using the first process, cause the device to:

cause the request to bypass a processing queue of the provisioning system of a regular activation framework associated with the second process;

identify one or more first network elements, of the network, to be provisioned based on the request and based on determining that the type of the client device or the type of the service is associated with provisioning and activating the client device using the first process;

generate one or more first provisioning commands and one or more first activation commands for the one or more first network elements based on the request;

provision the one or more first network elements with the one or more first provisioning commands; and activate the client device based on the one or more first activation commands and in near-real-time relative to receiving the request; and wherein the one or more instructions, that cause the device to provision the network for the client device and activate the client device using the second process, cause the device to:

provide the request to the processing queue for a time period.

14. The non-transitory computer-readable medium of claim 13, wherein the one or more instructions further cause the device to:

receive a response indicating that the client device is activated to utilize the one or more first network elements of the network.

15. The non-transitory computer-readable medium of claim 13, wherein the client device is one of a low latency device or an Internet of Things security monitoring device.

16. The non-transitory computer-readable medium of claim 13, wherein the one or more first network elements include one or more of:

a charging function, a uniform data repository, a subscriber profile controller, a unified data management device, a diameter routing agent, a subscription locator function, or a telephony application server.

17. The non-transitory computer-readable medium of claim 13, wherein the device is one of the provisioning system or a mobile telephony activation system.

18. The non-transitory computer-readable medium of claim 13, wherein the one or more instructions, that cause the device to provision the one or more first network elements with the one or more first provisioning commands, cause the device to:

utilize one or more real-time synchronous application programming interfaces to provision the one or more first network elements with the one or more first provisioning commands.

19. The device of claim 7, wherein the one or more processors, to provision the network for the client device and activate the client device for the network using the second process, are further configured to:

identify one or more network elements, of the network, to be provisioned based on the request;

generate one or more provisioning commands and one or more activation commands for the one or more network elements based on the request;

provision the one or more network elements with the one or more provisioning commands after the time period expires; and activate the client device based on the one or more activation commands.

20. The non-transitory computer-readable medium of claim 13, wherein the one or more instructions, that cause the device to provision the network for the client device and activate the client device using the second process, further cause the device to:

identify one or more second network elements, of the network, to be provisioned based on the request;

generate one or more second provisioning commands and one or more second activation commands for the one or more second network elements based on the request;

provision the one or more second network elements with the one or more second provisioning commands after the time period expires; and activate the client device based on the one or more second activation commands.

* * * * *